United States Patent [19]

Brzozowski et al.

[11] 4,074,989

[45] * Feb. 21, 1978

[54] METHOD OF PREPARING ANHYDROUS BORIC ACID-CONTAINING GLASS BATCH

[75] Inventors: Stanley F. Brzozowski, Coraopolis; Joseph E. Cooper, Brackenridge, both of Pa.

[73] Assignee: PPG Industries, Inc., Pittsburgh, Pa.

[*] Notice: The portion of the term of this patent subsequent to Feb. 21, 1995, has been disclaimed.

[21] Appl. No.: 739,883

[22] Filed: Nov. 8, 1976

[51] Int. Cl.$^2$ .............................................. C03B 5/16
[52] U.S. Cl. ........................................ 65/27; 65/134; 65/136; 106/50; 106/54
[58] Field of Search ................... 106/50, 54, DIG. 8; 65/27, 134, 136

[56] References Cited

U.S. PATENT DOCUMENTS

| 2,334,961 | 11/1943 | Schoenlaub | 65/134 X |
| 2,366,473 | 1/1945 | Bair | 106/50 X |
| 2,976,162 | 3/1961 | Ekdahl | 65/134 X |
| 3,001,881 | 9/1961 | Slayter | 65/134 X |
| 3,274,006 | 9/1966 | McKinnis | 106/50 |
| 3,287,095 | 11/1966 | Procter et al. | 65/2 |
| 3,880,639 | 4/1975 | Bodner et al. | 64/134 |
| 3,887,671 | 6/1975 | Metzger | 264/43 |
| 3,914,364 | 10/1975 | Engelleitner et al. | 264/117 |

*Primary Examiner*—Robert L. Lindsay, Jr.
*Attorney, Agent, or Firm*—Alan T. McDonald; John E. Curley

[57] ABSTRACT

A process is described for preparing anhydrous boric acid (ABA)-containing glass batch compositions suitable for the preparation of glass fibers in which the batch, prior to its introduction into the furnace, is pelletized by adding water in sufficient quantities to maintain an adequate balling action and thus provide pellets in a form such that preheating by direct contact with flue gases does not cause deterioration of the pellets.

5 Claims, No Drawings

METHOD OF PREPARING ANHYDROUS BORIC ACID-CONTAINING GLASS BATCH

BACKGROUND OF THE INVENTION

Fiber glass batches, unlike soda-lime glass batches and other commercial batches utilized to make containers and flat glass, are fed to fiber glass melting furnaces in an extremely fine condition, i.e., almost all of the batch particles are less than 20 mesh, with the majority being less than 200 mesh. Because of the fineness of the batch ingredients, dusting is encountered in fiber glass batch melting furnaces. In addition, fiber glass batches contain considerable quantities of boron-containing materials and other rather expensive ingredients, some of which are lost in the stack gases should dusting occur during feeding. Further, some of these batch materials volatilize into the stack gases as they are melted. By cohesively binding batch ingredients of the fineness normally encountered in a fiber glass batch, reduced dusting and volatilization of the batch ingredients and the concomitant reduction in the loss of expensive ingredients can be achieved. In addition, by providing fiber glass batch in pelletized form, advantage can be taken of the sensible heat contained in the furnace flue gases to preheat the fiber glass batch pellets prior to feeding them to the glass melting furnace. Further, the close contact between the particles within the pellets improves their heat transfer characteristics and thus results in faster melting, improved energy efficiency and reduced furnace wear.

Considerable activity has taken place in recent years and particularly in relation to the preparation of soda-lime glass batches in which the batch ingredients have been pelletized for feed to glass melting furnaces. Thus, a recent U.S. Pat. No. 3,880,639 describes the utilization of an agglomerated soda-lime glass batch in which the pellets are preheated via direct heat exchangers prior to feeding them to a glass melting furnace.

Activity has also occurred in the preparation of fiber glass batches in that glass batches have been prepared with various binding materials for the preparation of briquettes for feeding to glass melting furnaces. U.S. Pat. No. 2,976,162 describes a process of this nature. In other patent literature involved in the preparation of fiber glass type batches, special treatments have been applied to the glass batch to provide for prereaction of glass batch ingredients prior to feeding them to the glass melting furnace. A process of this character is described in U.S. Pat. No. 3,001,881. Still further, the glass batch ingredients themselves have been carefully selected to provide boron-containing glass batch materials of specific character, to help eliminate some of the foaming problems occurring during melting utilizing high boron-containing glass batches, such as are encountered in the fiber glass industry. A patent describing one such process is U.S. Pat. No. 3,287,095.

THE PRESENT INVENTION

In accordance with the present invention, boron-containing fiber glass batch pellets utilizing anhydrous boric acid as the boron source are prepared by introducing the batch ingredients in appropriate proportions into a pelletizing zone, such as an inclined rotating disc pelletizer, as is shown in U.S. Pat. No. 3,914,364, which is incorporated herein by reference, and adding to the batch ingredients as they are rotated on the pelletizer sufficient water to agglomerate and support the continuous production of glass batch pellets of a desired size. The pellets may range in nominal diameter, for example, from about 0.125 to about 1.00 inch (0.3175 to 2.54 centimeters) and preferably between about 0.375 and 0.625 inch (0.9525 and 1.5875 centimeters). Sufficient water is added to bind the batch ingredients together and provide pellets preferably containing approximately 10–25 percent by weight free water. Most preferably, the water is added to provide approximately 15–17 percent by weight free water. The pellets, after formation, are dried at a temperature of at least about 450° F. (232.2° C.) for a sufficient period of time to provide a free water content preferably of below about 1 percent by weight. Hard, substantially non-dusting pellets are thus produced. The hard, non-dusting pellets thus formed can be fed to a glass melting furnace and exposed to conditions in excess of 2700° F. (1482.2° C.) without any explosions of the pellets occurring.

DETAILED DESCRIPTION OF THE INVENTION

Typical "E" glass type boron-containing glass fiber forming batch compositions, such as those illustrated in U.S. Pat. No. 2,334,961, which is incorporated herein by reference, comprise silica, clay, limestone, coal, fluorspar, sodium sulfate, ammonium sulfate and anhydrous boric acid. There is no caustic soda present in the composition. These glass batch ingredients, when prepared in accordance with the instant invention, are believed to undergo several chemical reactions during their deposition on the pelletizing disc and while water in the quantity sufficient to produce the pellets is being added to the ingredients and during the drying of the pellets. The primary reactions involved in the preparation of the pellets in accordance with the instant invention are believed to be as follows:

$$B_2O_{3_S} + 3\,H_2O_L \rightarrow 2H_3BO_{3_S} \tag{1}$$

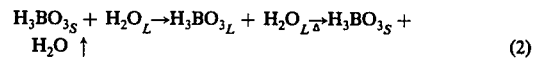

$$H_3BO_{3_S} + H_2O_L \rightarrow H_3BO_{3_L} + H_2O_L \rightarrow H_3BO_{3_S} + H_2O \uparrow \tag{2}$$

$$2\,H_3BO_3 \rightarrow B_2O_3 + 3\,H_2O \uparrow \tag{3}$$

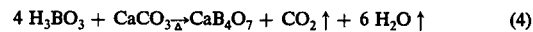

$$4\,H_3BO_3 + CaCO_3 \rightarrow CaB_4O_7 + CO_2 \uparrow + 6\,H_2O \uparrow \tag{4}$$

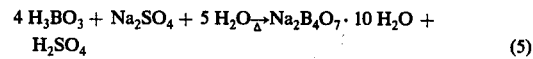

$$4\,H_3BO_3 + Na_2SO_4 + 5\,H_2O \rightarrow Na_2B_4O_7 \cdot 10\,H_2O + H_2SO_4 \tag{5}$$

$$CaCO_3 + H_2SO_4 \rightarrow CaSO_4 + CO_2 \uparrow + H_2O \uparrow \tag{6}$$

In reaction (1) the anhydrous boric acid is reacted with water to form boric acid. In reaction (2), the boric acid and water react to dissolve the boric acid and then the boric acid is recrystallized as shown in the equation. The recrystallized boric acid is dehydrated during the drying step to drive water off as shown in Equation (3). Some of the boric acid itself, during the drying of the pellets, reacts with the calcium carbonate present to form hydrated calcium pyroborate, carbon dioxide and water in accordance with Equation (4). Boric acid also reacts with the sodium sulfate present in the batch in accordance with Equation (5) to form hydrated sodium tetraborate and sulfuric acid. The limestone and the sulfuric acid may also react to form calcium sulfate, carbon dioxide and water, in accordance with Equation (6).

Regardless of the reactions that take place, it is extremely important in the preparation of the glass batch pellets in accordance with the instant invention that, during the drying step, the drying temperature be at least about 450° F. (232.2° C.). Attempts to dry pellets below this temperature result in their disintegration and return to the powdery state. Thus, extreme care is taken to provide a hard, non-dusting pellet by regulating the drying operations such that the pellets are dried at sufficient temperatures to produce hard, non-dusting pellets, i.e., at least about 450° F. (232.2° C.). The pellets may be dried at any higher temperature up to the melting point of a given pallet, which, of course, will vary according to the exact batch composition. By adhering to the temperature parameters hereinabove described with respect to their drying, pellets which are extremely hard and non-dusting are readily produced.

Pellets produced in accordance with the practice of the present invention thus provided to a glass melting furnace for the production of fiber glass are considerably less dusty than the loose batch ingredients conventionally employed. Further, since the boric acid is an excellent fluxing agent, the wetting of the boric acid upon its intimate contact with all of the batch ingredients, in addition to causing the reactions as hereinabove indicated in Equations (1) through (6) provides for intimate contact of the boron contained in the batch with all of the other batch grains present. This assists in rapidly melting the silica and alumina constituents of the glass batch which, as will be readily understood, are the most difficult ingredients to dissolve.

The pellets of the present invention may be preheated prior to their addition to the glass melting furnace such as, for example, by passing them through the flue gases of the furnace or passing the gases through a bed of the pellets. In addition to preheating the pellets and thus reducing the amount of furnace input energy needed to melt them, this passage of the flue gases through a bed of pellets may cause a reduction of air pollution from the flue gases by removing via a filtering action at least part of the harmful materials, such as $F_2$ and $B_2O_3$, from the flue gases. Utilizing hot flue gases at temperatures typically in the range of about 800° F. to 2850° F. (426.7° C. to 1565.5° C.), pellets can be preheated to temperatures of about 200° F. to 1500° F. (93.3° C. to 815.6° C.) to recover sensible heat and assist in reducing the amount of fuel needed to melt the pellets fed to the furnace.

EXAMPLE

An "E" type fiber forming glass batch comprising:

| Component | Percent by Weight |
|---|---|
| Silica | 31.532 |
| Clay | 28.615 |
| Limestone | 29.380 |
| Fluorspar | 2.469 |
| Sodium sulfate | 0.843 |
| Ammonium sulfate | 0.238 |
| Anhydrous Boric Acid | 6.835 |
| Coal | 0.088 | was combined on a disc pelletizer with sufficient water to produce pellets containing approximately 16 percent by weight free water. Portions of the pellets were dried at 220° F. (104.4° C.) for 28 minutes, 460° F. (237.8° C.) for 35 minutes and 1000° F. (537.8° C.) for 28 minutes.

The pellets dried at 460° F. (237.8° C.) and 1000° F. (537.8° C.) were hard and non-dusting, and could be physically handled without damage. However, the pellets dried at 220° F. (104.4° C.) completely disintegrated within the twenty eight minutes at drying.

While the present invention has been described with reference to specific embodiments thereof, it is not intended to be so limited thereby except as set forth in the accompanying claims.

We claim:

1. A method of preparing an anhydrous boric acid-containing glass fiber forming glass batch having a substantial amount of alumina therein comprising introducing anhydrous boric acid-containing batch ingredients into a pelletizing zone, agglomerating the ingredients with sufficient water to produce pellets containing about 10-25 percent free water by weight, heating the pellets at a temperature of at least 450° F. (232.2° C.) and drying the pellets at that temperature for a period of time sufficient to thereby prevent disintegration thereof and produce hard, nondusting pellets.

2. The method of claim 1 wherein said pelletizing zone comprises an inclined, rotating disc pelletizer.

3. The method of claim 1 wherein said pellets are produced having nominal diameters of between about 0.375 and 0.625 inch (0.9525 and 1.5875 centimeters).

4. The method of claim 1 wherein the pellets are dried to about 1 percent or less by weight free water.

5. The method of claim 1 wherein the free water is approximately 15-17 percent by weight.

* * * * *